United States Patent [19]
Harris

[11] Patent Number: 5,593,186
[45] Date of Patent: Jan. 14, 1997

[54] COUPLING FOR OUTER SURFACE ENGAGEMENT OF POLYMERIC PIPE

[75] Inventor: Wayne A. Harris, Adelaide, Australia

[73] Assignee: Philmac Pty Ltd, North Plympton, Australia

[21] Appl. No.: 403,798

[22] PCT Filed: Jul. 20, 1994

[86] PCT No.: PCT/AU94/00406

§ 371 Date: Mar. 17, 1995

§ 102(e) Date: Mar. 17, 1995

[87] PCT Pub. No.: WO95/03508

PCT Pub. Date: Feb. 2, 1995

[30] Foreign Application Priority Data

Jul. 20, 1993 [AU] Australia ................... PM0050

[51] Int. Cl.[6] ........................................ B65D 59/00
[52] U.S. Cl. ................ 285/23; 285/249; 285/322; 285/349
[58] Field of Search ..................... 285/242, 249, 285/255, 322, 323, 349, 23

[56] References Cited

U.S. PATENT DOCUMENTS

| | | | |
|---|---|---|---|
| 2,644,700 | 7/1953 | Woodling | 285/348 |
| 3,989,283 | 11/1976 | Pepper | 285/348 |
| 4,025,093 | 5/1977 | Leczycki | 285/348 |
| 4,062,572 | 12/1977 | Davis | 285/348 |
| 4,188,051 | 2/1980 | Burge | 285/249 |
| 4,627,644 | 12/1986 | Ekman | 285/249 |
| 4,878,697 | 11/1989 | Henry | 285/322 |
| 5,121,949 | 6/1992 | Reese | 285/322 |

FOREIGN PATENT DOCUMENTS

| | | | |
|---|---|---|---|
| 1667176 | 2/1978 | Australia. | |
| 5643680 | 9/1980 | Australia. | |
| 2271388 | 4/1989 | Australia. | |
| 503737 | 9/1992 | European Pat. Off. | 285/249 |
| 562999 | 9/1993 | European Pat. Off.. | |
| 2260056 | 8/1975 | France | 285/249 |
| 2002079 | 2/1979 | United Kingdom | 285/249 |
| 2258895 | 2/1993 | United Kingdom. | |

*Primary Examiner*—Eric K. Nicholson
*Assistant Examiner*—Heather Shackelford
*Attorney, Agent, or Firm*—Watts, Hoffmann, Fisher & Heinke Co., L.P.A.

[57] ABSTRACT

A coupling for engagement with the outer surface of a polymeric pipe, having a sub-assembly of a compression sleeve (24), a resilient gasket ring (18) permanently attached to the inner end of the compression sleeve (24), a gripping member (25), and a nut (30). The gasket ring (18) encounters an abutment in a socket (17) in the body (12) as the nut (30) is tightened, and further tightening of the nut (30) radially compresses the gripping member (25) so that its inwardly directed barbed projections (26) engage the outer surface of a pipe (11) to which the coupling is attached. The end of pipe (11) is freely insertable through the gripping member (25) and sleeve (24), and into the socket (17) in the body (12). There are also provided abutment surfaces within the body coupling and the nut which abut inner and outer surfaces (34, 35) of a flange outstanding from the outer end of the compression sleeve (24). Also disclosed is an embodiment with a transition spigot (46) having a barbed tail inserted into an end of a pipe enabling the coupling to accommodate a range of similar but different diameter pipes.

6 Claims, 3 Drawing Sheets

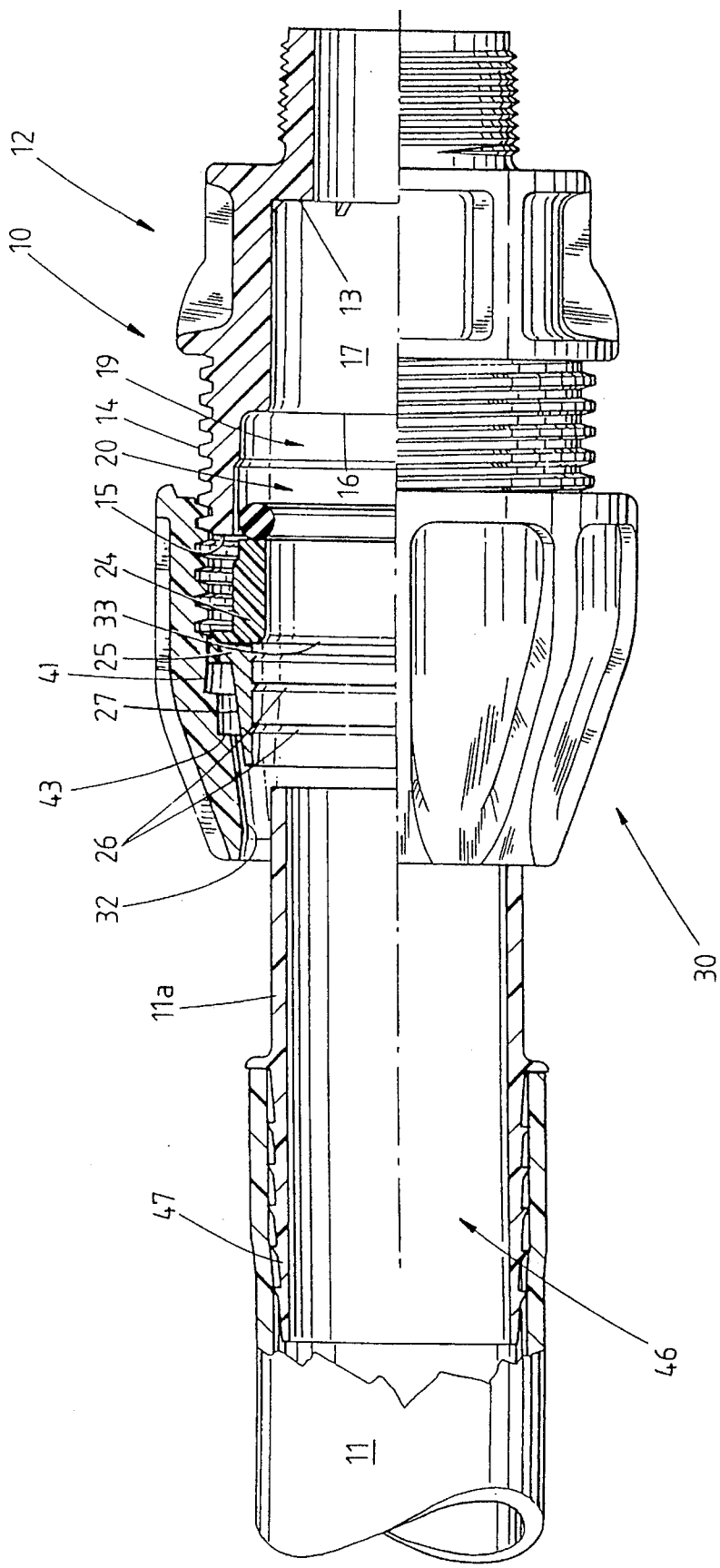

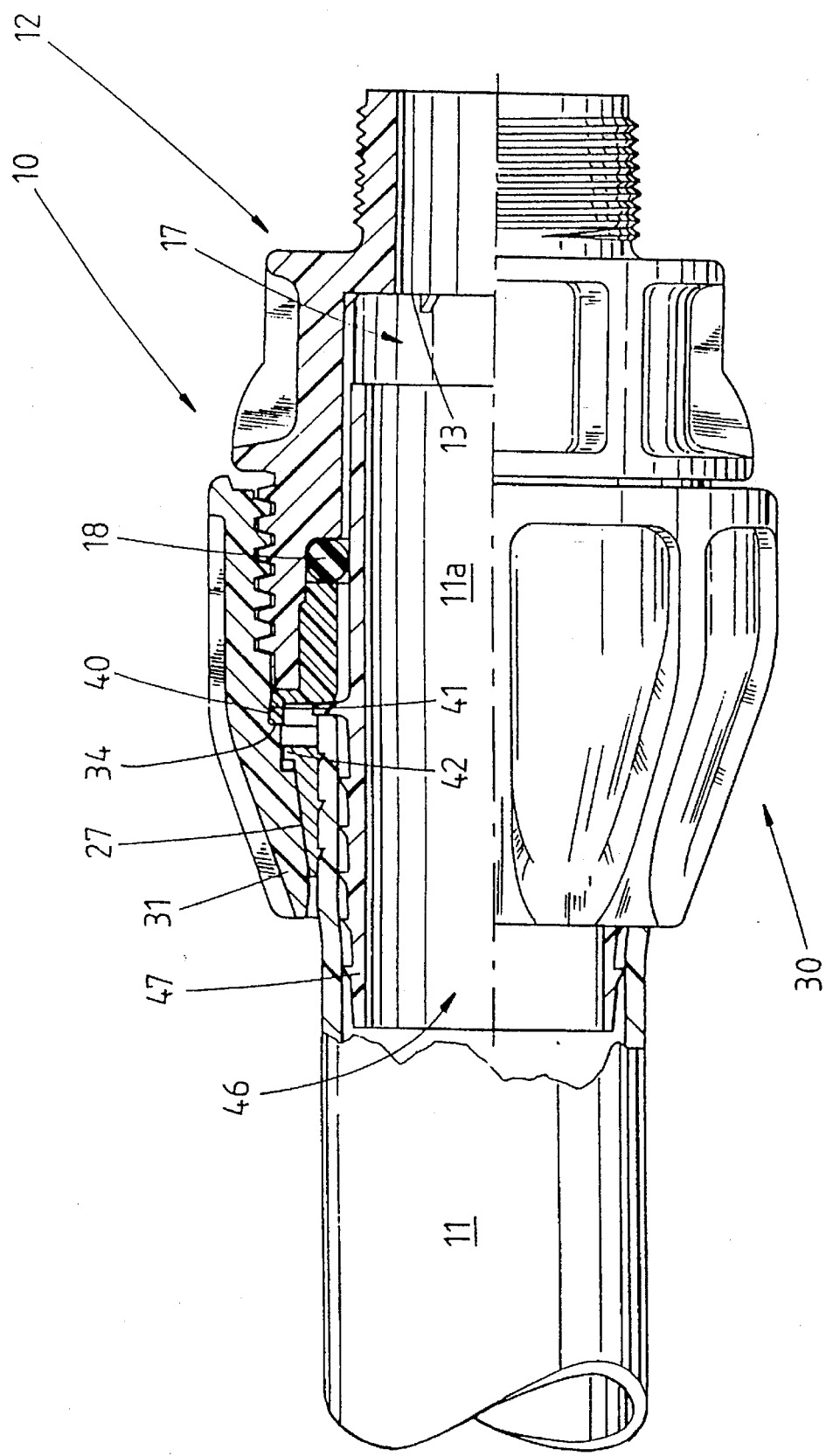

COUPLING FOR OUTER SURFACE ENGAGEMENT OF POLYMERIC PIPE

This invention relates to a coupling which is suitable for engaging the outer surface of a polymeric pipe, without it being always essential for an internal sleeve to be inserted into the pipe.

BACKGROUND OF THE INVENTION

In our Australian Patent 534452 entitled "Improvements in Pipe Fittings", a pipe fitting was described and illustrated wherein a sleeve was provided with a tail for insertion into a pipe, and there was also provided a compression ring having serrations thereon for compressing the end of the pipe against the outer surface of the tail, the tail preferably having serrations thereon. There was also provided a sealing ring of elastomeric material which engaged between the sleeve and a body, and the assembly was achieved by means of a sleeve nut which had a tapered inner surface which engaged a complementary male tapered outer surface of the compression ring. The sleeve was also provided with a pair of spaced peripheral flanges, one bearing against the resilient gasket ring and the other bearing against one end of the compression ring, so that the axial distance between those two rings did not vary upon tightening of the nut.

The pipe fittings described in the aforesaid specification have proven to be very successful, both technically and commercially. Failure is almost unknown and in some areas of the world fittings made in accordance with that specification are sold in greater numbers than their competitor's fittings.

A practical problem which is frequently encountered with fittings made in accordance with said patent 534452 (and other fittings in common use), is that the nut and compression ring needs to be positioned over a pipe end before tail of the sleeve is inserted. If either the nut or ring is inadvertently omitted, the tail usually cannot be withdrawn (because of barbed serrations), and it becomes necessary to cut the pipe.

The main object of this invention is therefore to provide improvements whereby the body, nut and gripping member (compression ring) can comprise a preliminary assembly through which can be inserted a pipe, which can simply be secured by tightening the nut, or removed by unscrewing.

Further, there is a need for a fitting which does not always have a tail inserted within a pipe, thereby avoiding interference with fluid flow within the pipe, and which takes advantage of the existence of an acceptable standard of accuracy of diameter of some polymeric pipes. For example the variation in outer diameter of a 50 mm pipe is likely to be less than 0.5 mm (0.020"). This makes it possible to have a coupling which engages only the outer surface of a pipe, and which restrains a pipe against leakage and against axial displacement, relying upon the stiffness of the pipe itself.

It is known that there exist fittings each comprising an outer cylindrical body which does not have any sleeve nut, but has an inner taper surface which converges in the direction of the pipe to which it is to be attached, the inner taper surface co-operating with a compression sleeve having a sawtooth profile to grip the outer surface of a pipe, and the pipe is merely pushed into the end of the body and through the taper sleeve and pulled outwardly again, causing the sawtooth projections to firmly grip the surface of the pipe, and retain the pipe in position. This is a simple and inexpensive fitting, but sometimes disassembly is difficult to achieve.

In some prior art fittings, it is sometimes necessary to chamfer a pipe end before insertion into the fitting, or lubricate a pipe end, or both, and this is quite inconvenient. Further, manual insertion is sometimes necessary to effect a seal between pipe and fitting, and this can involve distortion of a gasket ring, by application of direct axial force.

Another of the objects of this invention is to provide a coupling which comprises a nut which positively both compresses a gasket ring against a surface to effect a seal against leakage, and which limits the amount of gripping of the pipe, both to a predetermined level, thereby providing means which prevents excessive distortion of the resilient gasket ring, and also controls the degree of compression of a gripping member onto a pipe. Without such limiting means, a possibility exists of destruction of the split ring. It is known in the art that split rings of the "finger" type can be destroyed upon excessive forces being imparted.

A further difficulty which may conceivably be encountered with fittings of the sleeve type which contain both resilient gaskets and split rings with sawtooth profiles, is that although supplied in relaxed state, they can be tightened by hand inadvertently and thereby force the resilient gasket ring into a tapered socket from which it is not readily withdrawn. Such fittings if again relaxed, leave the gasket rings in position and there is always a danger of damage with consequential subsequent leakage if the gasket rings are hooked out or pushed out with a sharp instrument. A further object of the invention is to provide means whereby the resilient gasket ring will be withdrawn upon unscrewing of the nut.

A still further object of the invention is to have an arrangement whereby the degree of compression of the resilient gasket ring and gripping member with inwardly directed barb projections is controlled by the dimensions of the components of the coupling to be effective within a range of tolerance of diameter of the pipe with which the coupling is to be used, ensuring proper sealing of the resilient gasket ring and proper gripping of the pipe even when the pipe is on "bottom tolerance", but also assuring that there is unlikely to be damage to the resilient gasket ring, to the gripping member or to the pipe due to over tightening of a sleeve nut.

Situations arise whereby pipes produced to different standards (Australian, I.S.O., British, American etc) vary by relatively small amounts in their bore, but the outer diameters are not always compatible with a fitting made to a different standard, and a still further object of the invention is to provide a transition means between a pipe and a fitting, so as to reduce inventory costs, one standard size fitting then being useable with pipes of similar but not identical size made to different standards by a mere selection of inexpensive transition means.

PRIOR ART

The closest prior art known to the applicant is the U.S. Pat. No. 4043576 in the name of REICH and LEHMANN of Switzerland and assigned to GEORGE FISCHER AKTIENGESELLSCHAFT.

In that specification, there was provided a coupling for a smooth pipe which included a body, a nut threaded onto the body, a gasket inside the body and a thrust and locking ring structure within and between that housing and sleeve nut. The body had an inner tapered surface to compress the gasket. When the nut was threaded onto the housing, the locking ring structure was moved axially by an abutment shoulder on the nut to compress the gasket through a compression sleeve to a degree which was predetermined, and the nut subsequently deformed the tongues of the locking ring structure to grip the pipe.

BRIEF SUMMARY OF THE INVENTION

In this invention, however, there is provided a gripping member and a sub-assembly of compression sleeve and resilient gasket ring permanently attached to the inner end of the compression sleeve. A pipe end is freely insertable through the sub-assembly and into a socket in the body of the coupling. The gasket ring encounters an abutment in its socket in the body as the nut is tightened, and further tightening of the nut radially compresses the gripping member so that its inwardly directed barbed projections engage the outer surface of a pipe to which the coupling is attached. There are also provided abutment surfaces within the body of the coupling and the nut which abut inner and outer surfaces of a flange outstanding from the outer end of the compression sleeve.

BRIEF DESCRIPTION OF THE DRAWINGS

Two embodiments of the invention and described hereunder in some detail with reference to, and are illustrated in, the accompanying drawings, in which:

FIG. 3 is a half section elevation similar to FIG. 1, showing the arrangement, before its insertion, when the pipe end is an end of a transition spigot; and FIG. 4 is a section similar to FIG. 3, but showing the configuration when the nut is tightened.

Figure 1:
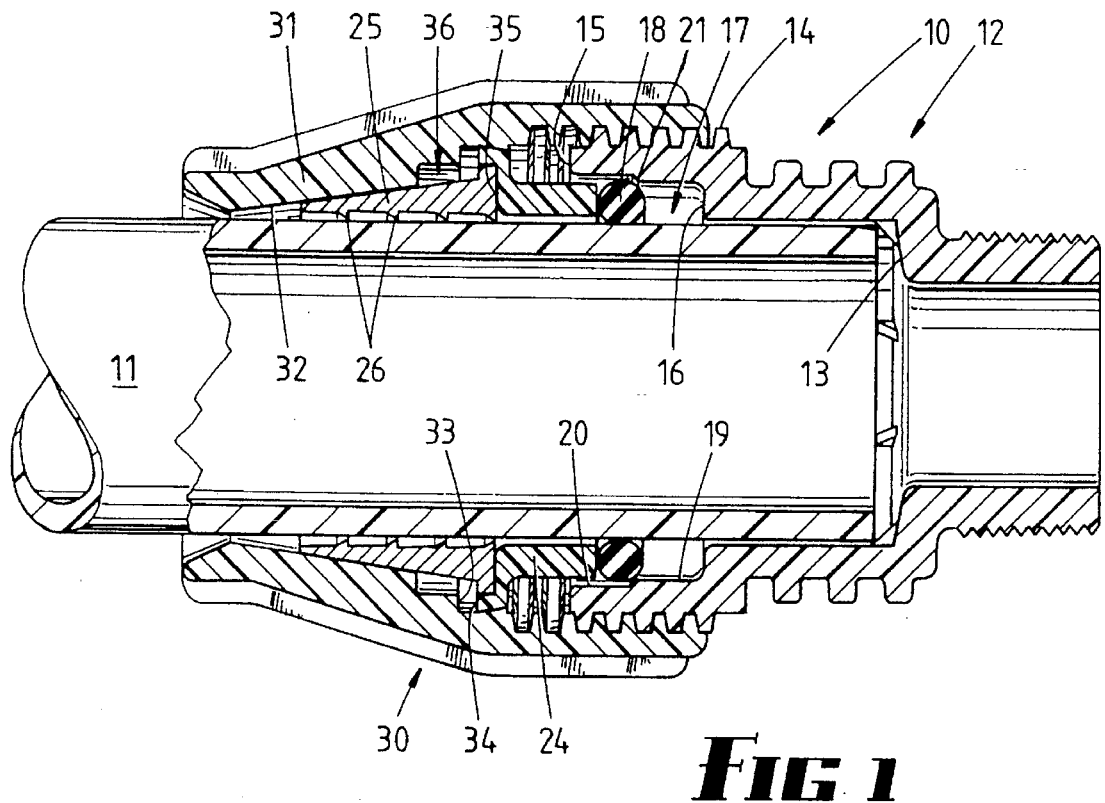
FIG. 1 is a central elevational section which shows a pipe end inserted through a sub-assembly comprising a nut, gripping member and sleeve, and into a socket in the body of a fitting.
Figure 2:
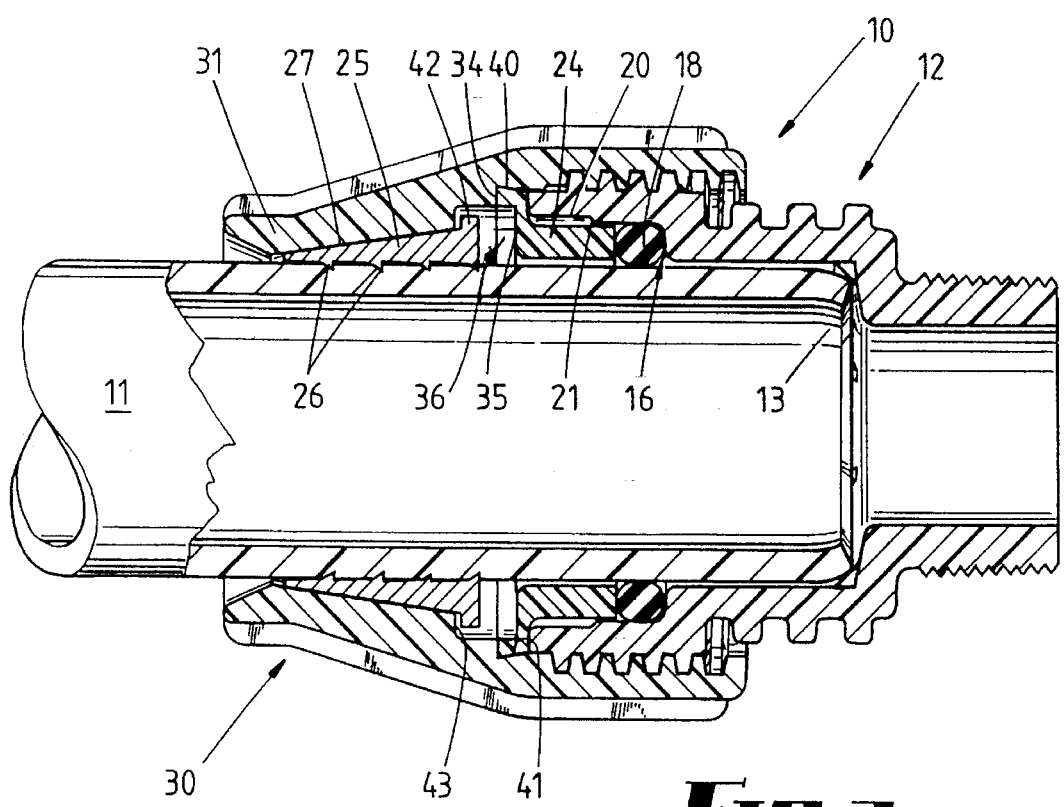
FIG. 2 is a similar section showing the configuration of components when the nut is tightened onto the body.

In the first embodiment of FIGS. 1 and 2, a coupling 10 for outer surface engagement of a polymeric pipe 11 comprises a body 12 which has an internal abutment shoulder 13 which is abutted by the end of pipe 11 when inserted into the coupling as shown in FIG. 1. The body 12 has a male thread 14, and between the outer end 15 and the shoulder 13 is a generally annular planar surface 16 which constitutes an abutment surface of a socket 17 for a resilient gasket ring 18, abutment shoulder 13 of the socket 17 being the inner end of the socket, the socket 17 also having two cylindrical intermediate and axially outer walls 19 and 20 separated by a step 21 (three diameters in all), the diameter of the outer wall 20 exceeding that of the inner wall 19.

Surrounding the pipe 11 is a compression sleeve 24 which carries the resilient gasket ring 18 on its inner end, being fused, bonded, or otherwise affixed to the end of the compression sleeve 24. This could alternatively be engaged by a mechanical tongue and groove or otherwise affixed on the face end of the sleeve 24, and the outer diameter of gasket ring 18 is less than the diameter of outer wall 20 but greater than diameter of intermediate wall 19, so that the compression sleeve can be readily inserted into the body 12 with the gasket ring 18 being freely movable within the wall 20 but requiring compression by axial movement of compression sleeve 24 to enter the wall 19.

Adjacent but axially outwardly of sleeve 24 is a gripping member 25 having radially inwardly but axially spaced barb projections 26, and having an outwardly converging tapered surface 27. The gripping member 25 must be radially deformable, and thereby circumferentially deformable, and is typically a split ring.

The nut 30 is provided with a tail 31 having an outwardly converging inner tapered surface 32 the included angle of which is approximately the same as the tapered surface 27 of the gripping member 25, and inwardly from the outer end of tail 31 there is an annular planar shoulder 33 which, upon tightening of the nut 30, will bear against end surface 34 of compression sleeve 24.

The annular surface 35 of the flange at the outer end of sleeve 24 is spaced axially inwardly a short distance from the surface 34.

Assuming that the pipe 11 is inserted into the socket 17 of the coupling as shown in FIGS. 1 and 2, initial tightening of the nut 30 on the body 12 will not cause abutment of shoulder 33 with annular surface 34 of the sleeve 24. The inner end of the gripping member 25 is loosely contained within a recess 36 in the outer end of sleeve 24, and the gasket ring 18, sleeve 24 and gripping member 25 move in together with the nut 30 since there is a clearance of all portions of the coupling around the polymeric pipe 11 when it is first inserted. However, after the nut 30 travels a short axial distance inwardly the gasket ring 18 is intercepted by the step 21 and will not pass that step until compressed. Continued movement of the nut therefore causes a small axially inward movement of the sleeve 24 and the gripping member 25, and must be accommodated by the sliding of inner surface 32 over the outer tapered surface 27, in turn causing the barb projections 26 of the gripping member 25 to engage the outer surface of pipe 11. Tightening of the nut 30 also brings the shoulder 33 into abutment with the annular surface 34 of compression sleeve 24 and progresses the sleeve 24 axially inwardly, causing sufficient compression of the gasket ring 18 for it to enter the inner smaller diameter intermediate portion 19 of the socket 17. The socket is of such dimension that the gasket ring 18 effects a satisfactory seal between the body 12 and the pipe 11, and this is further enhanced when the nut 30 is fully tightened so that the two surfaces of the sleeve 24 respectively lie in abutment with the outer end 15 of the body 12 and the shoulder 33 as shown in FIG. 2. At this location, further compression of the resilient gasket ring 18 results in a seal which is effective against very high pressures. However, rotational twisting of the gasket ring 18 is substantially avoided, as is rotational twisting of the gripping member 25. Since the nut cannot be progressed any further inwardly, the compression of both the rings 18 and 25 is controlled to lie within the range dictated by the diameter of the pipe 11.

If the pipe 11 is not inserted into the body 12 and the nut is screwed forwardly, the pipe will not be able to be forced inwardly to the body unless the nut is screwed back to its loose state.

When the nut is screwed back the compression sleeve is also pulled back due to a loose engagement of the reverse tapered surfaces 40 of compression sleeve 24 and 41 of sleeve nut 30, and subsequent abutment of compression sleeve 24 against inner end of gripping member 25. Because the gasket ring 18 is attached to the inner end of sleeve 24, that is also withdrawn and does not remain in the small diameter portion of socket 17.

As seen best in FIG. 2, when sleeve nut 30 is tightened over body 12, radially outstanding flange 42 of gripping member 25 lies adjacent shoulder 43 of nut 30. If a tensile load is applied to pipe 11 and body 12 is fixed, any relative movement will initially impart more radial compression to gripping member 25, but such movement (if any) will be very small, and will be resisted by abutment of flange 42 against shoulder 43.

With the invention, the body may be used with an insert and on a standard insert fitting as described in the aforesaid Australian Patent No. 534452. It will be appreciated that the assembly may be sold with the components in place and held captive while nevertheless retaining a clearance over the outer surface of pipe 11.

The second embodiment of FIGS. 3 and 4 illustrates how a pipe 11 of outer diameter which may differ slightly in different standards may be accommodated in a coupling or other fitting which embodies the features of this invention. The innermost portion of socket 17 is the same in FIGS. 3 and 4 as in FIGS. 1 and 2, and the effective portion of pipe 11 is extension 11a of a transition spigot 46, which enters socket 17 and is of constant diameter with a range of transition spigots, which however have varying diameter barbed tails each insertable into an end of a pipe with an interference fit, of one of a number of pipes 11 of various diameters which differ by only small amounts. Thus it is not necessary to produce or stock so many fittings to accommodate pipes of similar but not identical diametral dimension produced to different standards.

I claim:

1. A polymeric pipe coupling comprising:
   a) a body having an external thread, axially aligned annular inner surfaces and a radially extending axially outwardly facing inner end surface defining a socket within the body, said axially aligned annular inner surfaces being of larger diameter at an outer end of said socket than inwardly thereof;
   b) a nut having an internal thread adjacent an inner end thereof engaging said body external thread, the nut also having a radially extending axially inwardly facing internal abutment surface between ends of said nut and an axially outwardly converging internal circular surface between said abutment surface and another end of said nut, the nut further having a sleeve retention surface adjacent said inwardly facing internal abutment surface;
   c) an annular compression sleeve having a first abutment surface at an outer end co-operable with said nut abutment surface, the sleeve also having a second abutment surface spaced axially inwardly from the first said abutment surface and co-operable with said outer end of said body upon tightening of said nut, the sleeve further having a retention surface co-operable with said nut retention surface to be loosely retained by said nut;
   d) a resilient gasket ring secured to an inner end of said sleeve;
   e) a deformable gripping member having an axially outwardly converging outer surface complementary to said axially outwardly converging internal nut surface, the gripping member having an internal surface with barbs extending radially inwardly therefrom,
   f) internal diameters of said socket inner end, sleeve and gripping member all being only slightly greater than an external diameter of a pipe to which said coupling is securable, such that an end of such pipe is freely insertable through said gripping member, sleeve and gasket ring into said socket inner end, and tightening of said nut over said external thread causes axial movement of said sleeve, sealing engagement of said gasket ring with said body and such pipe, and radially inward deformation of said gripping member such that said barbs clamp such pipe; and,
   g) said retention surfaces of said nut and said annular compression sleeve being loosely engaging axially outwardly diverging surfaces which retain said sleeve to said nut as a preliminary assembly.

2. A polymeric pipe coupling according to claim 1 wherein said annular compression sleeve has a radial flange at its outer end, the flange having an axially inwardly facing abutment surface and an axially outwardly facing abutment surface arranged in a configuration whereby said axially inwardly facing abutment surface abuts said outer end of said body and said nut axially inwardly facing internal abutment surface abuts said flange axially outwardly facing abutment surface when said nut is tightened, in turn controlling degree of compression of said resilient gasket ring, and wherein said retention surface of said annular compression sleeve is located between said axially inwardly facing and axially outwardly facing abutment surfaces.

3. A polymeric pipe coupling according to claim 1 wherein said socket defining annular inner surfaces comprise a radially extending axially outwardly facing abutment shoulder at said socket inner end, said annular inner socket surfaces being generally cylindrical, an axially aligned outer socket surface being of larger diameter than the diameter of said inner socket surface and including a further axially aligned intermediate annular surface axially between said inner and outer socket surfaces and of diameter between said inner and outer socket surface diameters, and terminating in a generally annular planar surface, against which said gasket ring seals upon said tightening of said nut.

4. A polymeric pipe coupling according to claim 3 wherein the diameter of said axially aligned outer socket surface exceeds the outer diameter of said resilient gasket, and the diameter of said axially aligned intermediate annular surface is less than said gasket outer diameter, but of sufficient dimension to permit axial traverse of said sealing ring from said outer socket surface and into sealable engagement with said intermediate annular planar surface of said socket.

5. A polymeric pipe coupling according to claim 1 wherein said deformable gripping member is a split ring and at least certain of said barbs each have a saw-tooth shape in cross-section.

6. A polymeric pipe coupling comprising:
   a) a body having an external thread and annular inner surfaces defining a socket within the body having a larger diameter at an outer end than at an inner end of said socket;
   b) a nut having an internal thread at an inner end thereof engaging said body external thread, the nut also having an inwardly facing internal abutment surface between ends of said nut and an outwardly converging internal circular surface between said abutment surface and an outer one of said nut ends;
   c) an annular compression sleeve having an abutment surface at its outer end co-operable with said nut abutment surface, and a resilient gasket secured to its inner end;
   said abutment surfaces of said nut and said annular compression sleeve being loosely engaging axially outwardly diverging surfaces which retain said sleeve to said nut as a preliminary, assembly ;
   e) a deformable gripping member having an outwardly converging outer surface complementary to said outwardly converging internal nut surface, the gripping member having an internal surface with a first set of barbs extending radially inwardly therefrom;

f) wherein said socket defining surfaces comprise an abutment shoulder at said socket inner end, said annular inner socket surfaces being generally cylindrical, an outer socket surface being of larger diameter than the diameter of said inner socket surface and including a further intermediate annular surface axially between said inner and outer socket surfaces and of diameter between said inner and outer socket surface diameters, and terminating in a generally planar annular surface, against which said gasket ring seals upon tightening of said nut;

g) further comprising a hollow transition spigot having at one end a hollow tail insertable with an interference fit to sealably engage into a pipe, the tail having a second set of barbs projecting outwardly therefrom, the spigot also having a portion adjacent another end thereby forming a pipe extension which is compatible in diameter with said gripping member to be freely insertable through said griping member, sleeve and into said socket inner end, and wherein tightening of said nut over said external thread causes axial movement of said sleeve, sealable engagement of said gasket ring, said body and said pipe extension, and radially inward deformation of said gripping member such that barbs of each of said sets grip an inserted pipe said hollow transition spigot having a diameter of said one end slightly greater than the internal diameter of said pipe to form an interference fit.

* * * * *